US011006051B2

(12) United States Patent
Chang et al.

(10) Patent No.: US 11,006,051 B2
(45) Date of Patent: May 11, 2021

(54) DISPLAY DEVICE CAPABLE OF SWITCHING IMAGE SOURCES AND OPERATING SYSTEM

(71) Applicant: GIGA-BYTE TECHNOLOGY CO.,LTD., New Taipei (TW)

(72) Inventors: Kuei-Shan Chang, New Taipei (TW); Chin-Hui Chen, New Taipei (TW); Erh-Chia Joung, New Taipei (TW); Chun-Keung Chau, New Taipei (TW); Shih-Pin Chang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/999,538

(22) Filed: Aug. 21, 2020

(65) Prior Publication Data

US 2021/0092307 A1    Mar. 25, 2021

(30) Foreign Application Priority Data

Sep. 20, 2019 (TW) .................................. 108133908

(51) Int. Cl.
*H04N 5/268* (2006.01)
*G06F 3/041* (2006.01)

(52) U.S. Cl.
CPC ........... *H04N 5/268* (2013.01); *G06F 3/0416* (2013.01)

(58) Field of Classification Search
CPC ........ H04N 5/268; H04N 5/4401; H04N 5/44; H04N 5/445; H04N 5/45; G06F 3/0416;
(Continued)

(56) References Cited

U.S. PATENT DOCUMENTS

2013/0169755 A1* 7/2013 Choo ................. H04N 21/4263
                                                      348/46
2014/0289433 A1   9/2014 Soffer et al.
(Continued)

FOREIGN PATENT DOCUMENTS

CN    1997135 B      7/2013
CN    103748586 A    4/2014
TW    M316452 U      8/2007

OTHER PUBLICATIONS

Extended European Search Report for European Application No. 20174134.5, dated Sep. 23, 2020.
(Continued)

*Primary Examiner* — Sherrie Hsia
(74) *Attorney, Agent, or Firm* — Birch, Stewart, Kolasch & Birch LLP

(57) ABSTRACT

A display device is capable of switching between image sources and includes a first transmission interface, a second transmission interface, a first peripheral interface, a system on chip (SOC) and a display panel. The first transmission interface is configured to be coupled to a first electronic device and receive a first image signal from the first electronic device. The second transmission interface is configured to be coupled to a second electronic device and receive a second image signal from the second electronic device. The first peripheral interface is configured to be coupled to a first peripheral device providing input information. The SOC selects at least one of the first and second image signals according to the input information to generate a display signal. The display panel displays an image according to the display signal.

20 Claims, 8 Drawing Sheets

(58) Field of Classification Search
CPC ... G06F 3/00; G06F 3/02; G06F 3/021; G06F 3/0213; G09G 2340/12; G09G 5/14
USPC .............. 348/564, 563, 705, 706, 584, 598; 345/156, 519, 629, 634, 639, 640; 725/48, 49, 54, 59
See application file for complete search history.

(56) References Cited

U.S. PATENT DOCUMENTS

2016/0189665 A1* 6/2016 Kim ..................... G09G 5/377
                                                    345/634
2020/0052495 A1* 2/2020 Chen ................. H02J 7/00043

OTHER PUBLICATIONS

Taiwanese Office Action and Search Report for Taiwanese Application No. 108133908, dated Aug. 19, 2020.

* cited by examiner

DISPLAY DEVICE CAPABLE OF SWITCHING IMAGE SOURCES AND OPERATING SYSTEM

CROSS REFERENCE TO RELATED APPLICATIONS

This Application claims priority of Taiwan Patent Application No. 108133908, filed on Sep. 20, 2019, the entirety of which is incorporated by reference herein.

BACKGROUND OF THE INVENTION

Field of the Invention

The invention relates to a display device, and more particularly to a display device that is capable of switching image sources providing image signals.

Description of the Related Art

Generally, a personal computer typically comprises a display device, a host and many peripheral devices, such as a mouse and a keyboard. Many users have two or more personal computers. When a user needs to use many personal computers, many display devices are turned on and many peripheral devices may be utilized to control the personal computers. Therefore, the inconvenience for the user is increased.

BRIEF SUMMARY OF THE INVENTION

In accordance with an embodiment, a display device is capable of switching image sources and comprises a first transmission interface, a second transmission interface, a first peripheral interface, a system on chip (SOC) and a display panel. The first transmission interface is configured to be coupled to a first electronic device and receive a first image signal from the first electronic device. The second transmission interface is configured to be coupled to a second electronic device and receive a second image signal from the second electronic device. The first peripheral interface is configured to be coupled to a first peripheral device providing input information. The SOC selects at least one of the first and second image signals according to the input information to generate a display signal. The display panel displays an image according to the display signal.

In accordance with another embodiment, an operating system comprises a first electronic device, a second electronic device and a display device. The first electronic device provides a first image signal. The second electronic device provides a second image signal. The display device comprises a first transmission interface, a second transmission interface, a first peripheral interface, a SOC and a display panel. The first transmission interface is configured to be coupled to the first electronic device and receive the first image signal. The second transmission interface is configured to be coupled to the second electronic device and receive the second image signal. The first peripheral interface is configured to be coupled to a first peripheral device providing input information. The SOC selects at least one of the first and second image signals according to the input information to generate a display signal. The display panel displays an image according to the display signal.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
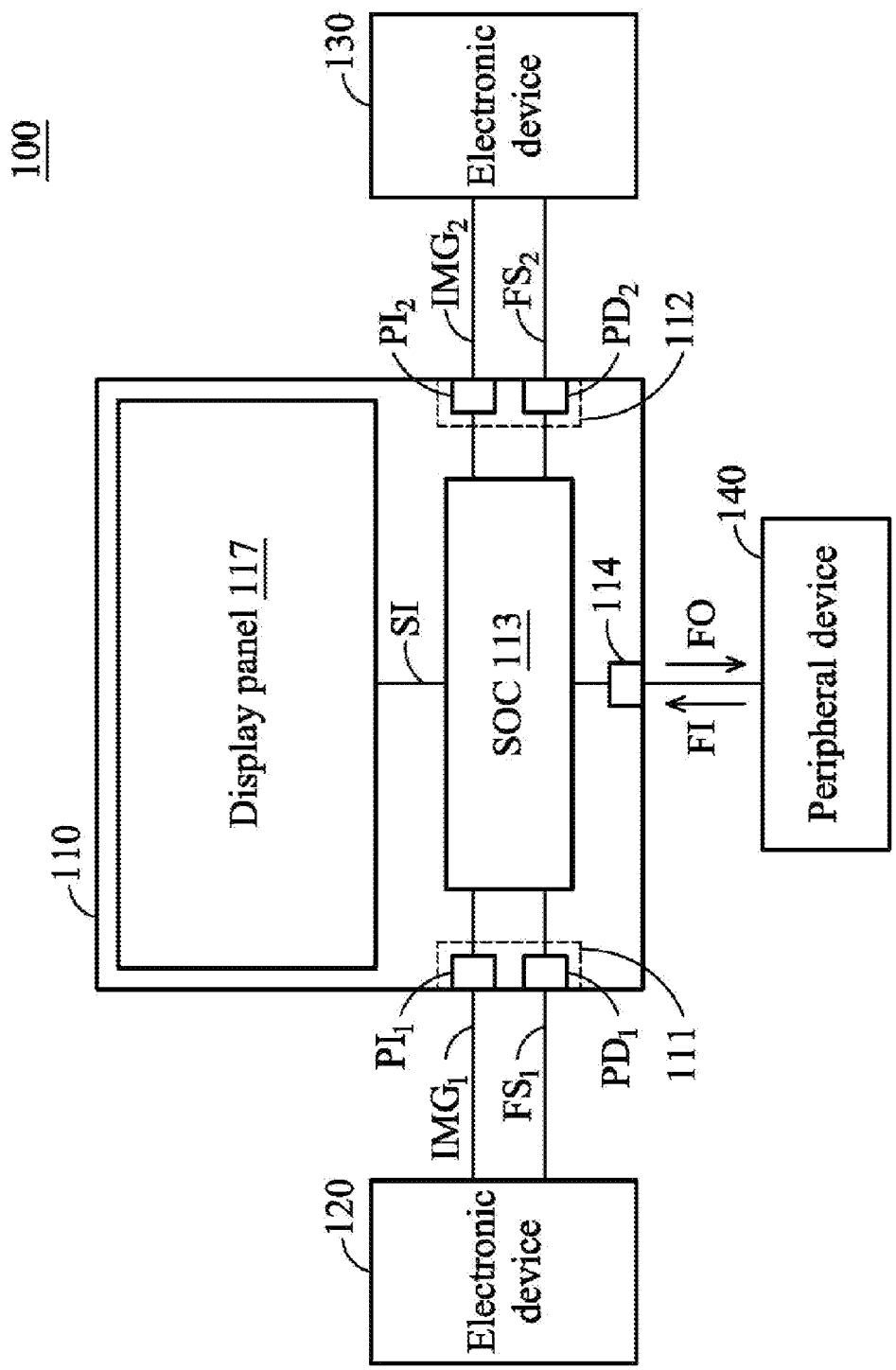
FIG. 1 is a schematic diagram of an exemplary embodiment of an operating system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operating system, according to various aspects of the present disclosure. The operating system 100 comprises a display device 100, electronic devices 120 and 130, and a peripheral device 140. In this embodiment, the electronic devices 120 and 130 share the display device 110 and the peripheral device 140. For example, when the electronic device 120 is coupled to the display device 110, the display device 110 displays an image according to the image signal $IMG_1$ provided by the electronic device 120. At this time, the electronic device 120 receives input information FI from the peripheral device 140 via the display device 110 or sends output information FO to the peripheral device 140 via the display device 110. When the electronic device 130 is coupled to the display device 110, the display device 110 displays an image according to the image signal $IMG_2$ provided by the electronic device 130. At this time, the electronic device 130 receives input information FI from the peripheral device 140 via the display device 110 or sends output information FO to the peripheral device 140 via the display device 110.

In other embodiments, when the display device 110 displays an image according to the image signal $IMG_1$ provided from the electronic device 120, if the electronic device 130 is coupled to the display device 110, the display device 110 still displays the image corresponding to the image signal $IMG_1$ provided from the electronic device 120.

In some embodiments, after the display device 110 is powered-on, if the display device 110 receives the image signal $IMG_1$ from the electronic device 120 and the image signal $IMG_2$ form the electronic device 130, the display device 110 may select the image signal $IMG_1$ or $IMG_2$ according to a predetermined value. For example, if the predetermined value indicates the electronic device 120, the display device 110 displays an image according to the image signal $IMG_1$. However, if the predetermined value indicates the electronic device 130, the display device 110 displays an image according to the image signal $IMG_2$. In one embodiment, the predetermined value is stored in the display device 110 beforehand.

The types of electronic devices 120 and 130 are not limited in the present disclosure. Any device can serve as the electronic device 120 or 130, as long as the device is capable of outputting an image signal. In one embodiment, at least one of the electronic devices 120 and 130 is a host device, a flat panel, a notebook computer, or a smartphone.

In other embodiments, if the display device 110 receives the image signal $IMG_1$ from the electronic device 120 and the image signal $IMG_2$ from the electronic device 130, the display device 110 displays a Picture-in-Picture (PIP) image according to the image signals $IMG_1$ and $IMG_2$. In one embodiment, if the electronic device 120 is coupled to the display device 110 earlier than the electronic device 130, the display device 110 displays a main image according to the image signal $IMG_1$ provided from the electronic device 120 and displays a sub-image in the main image according to the image signal $IMG_2$ provided from the electronic device 130. At this time, the electronic device 120 can communicate with the peripheral device 140 via the display device 110, but the electronic device 130 cannot communicate with the peripheral device 140 via the display device 110.

In some embodiments, when the display device 110 receives the image signal $IMG_1$ from the electronic device 120 and receives the image signal $IMG_2$ from the electronic device 130, the display device 110 may display two images. The two images have the same size. For example, the display device 110 displays a first image according to the image signal $IMG_1$ and displays a second image according to the image signal $IMG_2$, wherein the first image may be located in the left or the right of the second image. In this embodiment, the display device 110 comprises transmission interfaces 111 and 112, a system on chip (SOC) 113, a peripheral interface 114 and a display panel 117.

The transmission interface 111 is configured to the electronic device 120 and receives the image signal $IMG_1$. The invention is not limited to how the transmission interface 111 receives the image signal $IMG_1$. In one embodiment, the transmission interface 111 receives the image signal $IMG_1$ via a transmission cable. In another embodiment, the transmission interface 111 comprises a wireless transceiver (not shown). In this case, the transmission interface 111 utilizes a wireless method to receive the image signal $IMG_1$.

In this embodiment, the transmission interface 111 comprises an image transmission port $PI_1$ and a data transmission port $PD_1$. The image transmission port $PI_1$ is configured to receive the image signal $IMG_1$. The data transmission port $PD_1$ is configured to transmit data. For example, the data transmission port $PD_1$ may transmit the input information FI to the electronic device 120 or receives the output information FO from the electronic device 120. In other embodiments, the data transmission port $PD_1$ may transmit selection information $FS_1$ generated by the electronic device 120 to the SOC 113. In such cases, the SOC 113 operates according to the selection information $FS_1$. For example, the SOC 113 may adjust the display signal SI or send a control signal (not shown) to adjust the state (e.g., brightness) of the display panel 117 according to the selection information $FS_1$. In other embodiments, the selection information $FS_1$ may be combined in the image signal $IMG_1$. Therefore, the data transmission port $PD_1$ is capable of transmitting the selection information $FS_1$.

The type of image transmission port $PI_1$ is not limited in the present disclosure. In one embodiment, the image transmission port $PI_1$ is a higher definition multimedia interface (HDMI), a display port (DP), a video graphics array (VGA) port, a digital visual interface (DVI) port or a universal serial bus type-c (USB Type-C) port.

In some embodiments, when the image transmission port $PI_1$ is a USB Type-C port, the USB Type-C port can transmit the image signal $IMG_1$ and data (e.g., the output information FO, the input information FI or the selection information $FS_1$). Therefore, the data transmission port $PD_1$ can be omitted. Additionally, the type of data transmission port $PD_1$ is not limited in the present disclosure. Any transmission port can serve as the data transmission port $PD_1$, as long as the transmission port is capable of transmitting data. In one embodiment, the data transmission port $PD_1$ is a USB port.

The transmission interface 112 is configured to be coupled to the electronic device 130 and receive the image signal $IMG_2$. In this embodiment, the transmission interface 112 comprises an image transmission port $PI_2$ and a data transmission port $PD_2$. The image transmission port $PI_2$ is configured to receive the image signal $IMG_2$. The data transmission port $PD_2$ is configured to transmit data. Since the features of the image transmission port $PI_2$ and the data transmission port $PD_2$ are the same as the features of the image transmission port $PI_1$ and the data transmission port $PD_1$, the descriptions of the features of the image transmission port $PI_2$ and the data transmission port $PD_2$ are omitted.

In some embodiments, the image transmission port $PI_2$ may be the same or different from the image transmission port $PI_1$. For example, the image transmission ports $PI_1$ and $PI_2$ are HDMI ports. In other embodiments, the image transmission port $PI_1$ may be a DP port and the image transmission port $PI_2$ may be a HDMI port. The numbers of transmission interfaces are not limited in the present disclosure. In other embodiments, the display device 110 has more transmission interfaces to receive image signals from different electronic devices.

The peripheral interface 114 is configured to be coupled to the peripheral device 140. The peripheral interface 114 may utilize a wire method or a wireless method to receive the input information FI generated by the peripheral device 140 or provide the output information FO to the peripheral device 140. The type of peripheral interface 114 is not limited in the present disclosure. In one embodiment, the peripheral interface 114 comprises a USB port. Additionally, the number of peripheral interfaces is not limited in the present disclosure. In other embodiments, the display device 110 may comprise more or fewer display devices to couple to more or fewer peripheral devices.

The SOC 113 generates a display signal SI according to at least one of the image signals $IMG_1$ and $IMG_2$. The display panel 117 displays an image according to the display signal SI. For example, when the electronic device 120 is coupled to the transmission interface 111 and the electronic device 130 is not coupled to the transmission interface 112, the SOC 113 receives and processes the image signal $IMG_1$ provided from the electronic device 120 to generate a display signal SI. Therefore, the image displayed on the display panel 117 is controlled by the electronic device 120.

The invention is not limited to how the SOC 113 processes the image signal $IMG_1$. In one embodiment, the SOC 113 uses the image signal $IMG_1$ as the display signal SI. Furthermore, the SOC 113 further turns on a data path (not shown) between the data transmission port $PD_1$ and the peripheral interface 114 so that the electronic device 120 is capable of receiving the input information FI from the peripheral device 140 or providing the output information FO to the peripheral device 140. In other embodiments, when the transmission interface 111 comprises a specific transmission port (e.g., a USB Type-C port), the SOC 113 turns on the data path between the data pins of the specific transmission port and the peripheral interface 114.

When the electronic device 120 is not coupled to the transmission interface 111 and the electronic device 130 is coupled to the transmission interface 112, the SOC 113 receives and processes the image signal $IMG_2$ to generate a display signal SI. In one embodiment, the SOC 113 uses the image signal $IMG_2$ as the display signal SI. At this time, the SOC 113 turns on the data path (not shown) between the data transmission port $PD_2$ and the peripheral interface 114. Therefore, the electronic device 130 is capable of receiving the input information FI from the peripheral device 140 or providing the output information FO to the peripheral device 140.

When the electronic device 120 is coupled to the transmission interface 111 and the electronic device 130 is coupled to the transmission interface 112, the SOC 113 generates the display signal SI according to a predetermined value. For example, if the predetermined value points to the transmission interface 111, the SOC 113 generates the display signal SI according to the image signal $IMG_1$ and turns on the data path between the transmission interface 111 and the peripheral interface 114. If the predetermined value points to the transmission interface 112, the SOC 113 generates the display signal SI according to the image signal $IMG_2$ and turns on the data path between the transmission interface 112 and the peripheral interface 114. In other embodiments, the SOC 113 receives and combines the image signals $IMG_1$ and $IMG_2$ according to the predetermined value. The display panel 170 displays a PIP image according to the combined result (i.e., the display signal SI) provided by the SOC 113 or displays a PBP image which includes two neighbor images of the same size. In this case, only one electronic device (e.g., 120 or 130) is capable of communicating with the peripheral device 140 via the peripheral interface 114.

In other embodiments, the SOC 113 may perform a specific operation according to the selection information $FS_1$ or $FS_2$ from the electronic device 120 or 130. The specific operation is to switch a source which provides an image signal. For example, when the SOC 113 generates the display signal SI according to the image signal $IMG_1$ provided by the electronic device 120, if the electronic device 120 sends the selection information $FS_1$, the SOC 113 uses the image signal $IMG_2$ from the electronic device 130 and generates the display signal SI according to the image signal $IMG_2$. At this time, the SOC 113 turns off the data path between the electronic device 120 and the peripheral device 140 and turns on the data path between the electronic device 130 and the peripheral device 140. However, if the electronic device 130 is no coupled to the transmission interface 112, the SOC 113 may still use the image signal $IMG_1$ to generate a display signal SI. In one embodiment, the SOC 113 adds a notification image component in the display signal SI for displaying a notification image to notify the user that the electronic device 130 has not been coupled to the transmission interface 112. In another embodiment, the display panel 117 does not display any image because the SOC 113 does not receive the image signal $IMG_2$. However, when the electronic device 130 is coupled to the transmission interface 112, the SOC 113 immediately generates the display signal SI according to the image signal $IMG_2$.

In other embodiments, the SOC 113 may generate a display signal SI or an additional control signal (not shown) according to the selection information $FS_1$ or $FS_2$ sent from the electronic device 120 or 130 to control the state of the display panel 117. In this case, the brightness or resolution of the display panel 117 may be adjusted. In some embodiments, the SOC 113 may rotate the image displayed on the display panel 117 according to the selection information $FS_1$ from the electronic device 120 or the selection information $FS_2$ from the electronic device 130.

The formats of selection information $FS_1$ and $FS_2$ are not limited in the present disclosure. Using the selection information $FS_1$ as an example, in one embodiment, the selection information $FS_1$ is combined in the image signal $IMG_1$. The SOC 113 may encode the image signal $IMG_1$ to retrieve the selection information $FS_1$. In such cases, the SOC 113 may select the image source or adjust the display signal SI according to the selection information $FS_1$.

The disclosure is not limited to when the electronic devices 120 and 130 generate selection information $FS_1$ and $FS_2$. Using the electronic device 120 as an example, when a trigger event occurs, the electronic device 120 generates the selection information $FS_1$ to the SOC 113. The trigger event may be caused by the peripheral device 140. For example, assume that the peripheral device 140 is a keyboard. When the user presses a hot-key (e.g., to successively press F2 twice), it means that a trigger event occurs. Therefore, the electronic device 120 generates the selection information $FS_1$. In another embodiment, the trigger event is caused by the electronic device 120. For example, assume that the electronic device 120 is a smartphone. In this case, when the user draws a specific pattern on the electronic device 120, the electronic device 120 sends the selection information $FS_1$.

Figure 2:
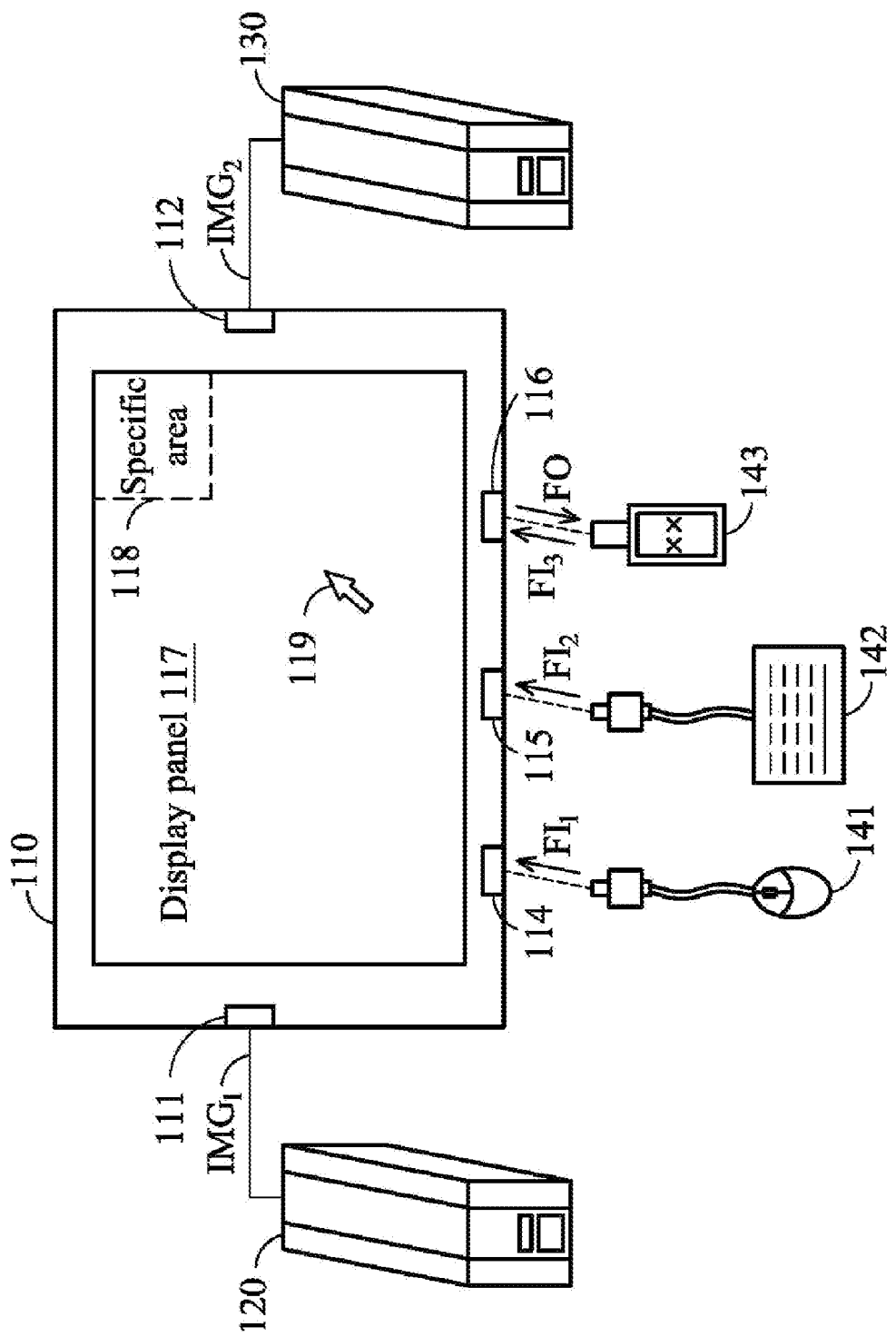
FIG. 2 is a schematic diagram of an exemplary embodiment of a display device, according to various aspects of the present disclosure.

FIG. 2 is a schematic diagram of an exemplary embodiment of a display device, according to various aspects of the present disclosure. In this embodiment, each of the electronic devices 120 and 130 is a host and the display device 110 further comprises peripheral interfaces 115 and 116. Since the features of peripheral interfaces 115 and 116 are the same as the feature of the peripheral interface 114, the descriptions of the features of the peripheral interfaces 115 and 116 are omitted. In this embodiment, the peripheral interface 114 is coupled to a mouse 141, the peripheral interface 115 is coupled to a keyboard 142, and the peripheral interface 116 is coupled to a USB disk 143.

For brevity, assume that the display device 110 displays an image according to the image signal $IMG_1$. In this case, when the mouse 141 is moved by the user, the mouse 141 generates input information $FI_1$. The electronic device 120 adjusts the image signal $IMG_1$ according to the input information $FI_1$ to change the position of the cursor 119. Furthermore, when the keyboard 142 is pressed by the user, the keyboard 142 generates input information $FI_2$. The electronic device 120 adjusts the image signal $IMG_1$ according to the input information $FI_2$ to display the text entered by the user. Additionally, the USB disk 143 may provide input information $FI_3$ to the electronic device 120 or receive and store output formation FO from the electronic device 120.

In this embodiment, the display panel 117 has a specific area 118. When the user moves the cursor 119 to the specific area 118 via the mouse 141 or the keyboard 142 and the duration of the cursor 119 being at the specific area 118 is equal to a predetermined time (e.g., 3 secs), a selection image is displayed in the specific area 118 so that the user can select the image source. In other embodiments, the specific area 118 displays the selection image when certain buttons, button sequences, or button combinations are activated. For example, when the user presses the F2 key twice in succession, the specific area 118 displays a selection image. In another embodiment, when the user presses the F2 twice in succession on the keyboard 142, the display device 110 directly changes the image source providing the image signal.

Figure 3B:
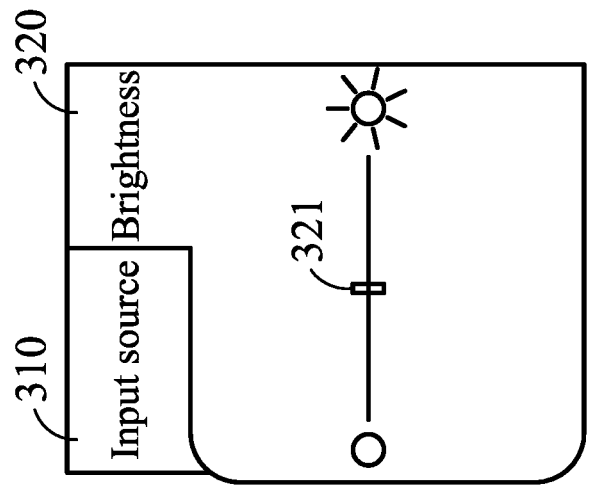
FIG. 3B is a schematic diagram of another exemplary embodiment of the selection image, according to various aspects of the present disclosure
Figure 3A:
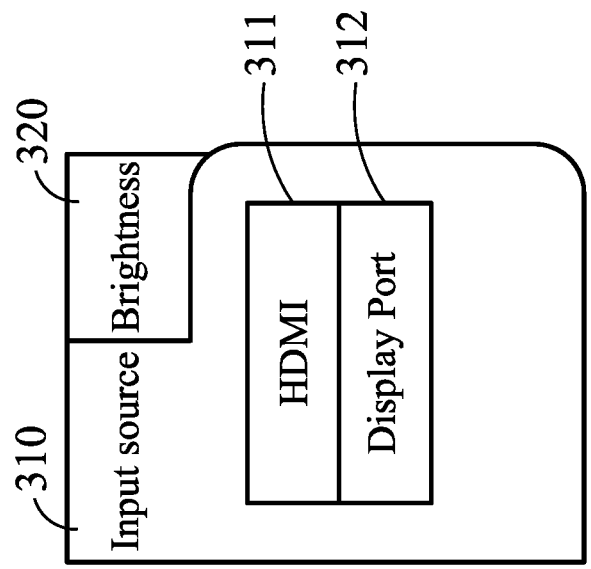
FIG. 3A is a schematic diagram of an exemplary embodiment of a selection image, according to various aspects of the present disclosure.

FIGS. 3A and 3B are schematic diagrams of exemplary embodiments of a selection image 300, according to various aspects of the present disclosure. The selection image 300 comprises an input source option 310. In other embodiments, the selection image 300 has more options or the fewer options so that the user can adjust the state of the display panel 117, such as the brightness or the resolution or to rotate the image displayed on the display panel 117.

As shown in FIG. 3A, when the user clicks the input source option 310, the image source is changed. For example, when the user clicks the option 311, the SOC 113 generates the display signal SI to the display panel 117 according to the image signal $IMG_1$ form the electronic device 120. At this time, the SOC 113 turns on the data paths between the electronic device 120 and the peripheral interfaces 114~116 and turns off the data paths between the electronic device 130 and the peripheral interfaces 114~116. If the user clicks the option 312, the SOC 113 generates the display signal SI to the display panel 117 according to the image signal $IMG_2$ from the electronic device 130. At this time, the SOC 113 turns on the data paths between the electronic device 130 and the peripheral interfaces 114-116 and turns off the data paths between the electronic device 120 and the peripheral interfaces 114-116.

In other embodiments, when the electronic device 130 is not coupled to the transmission interface 112 and the user clicks the option 312, the SOC 113 still turns on the data paths between the electronic device 120 and the peripheral interfaces 114~116. Therefore, the SOC 113 continuously generates the display signal SI to the display panel 117 according to the image signal $IMG_1$. In one embodiment, the SOC 113 may adjust the display signal SI to display a notification image on the display panel 117 so that the user obtains that the electronic device 130 has not been coupled to the transmission interface 112. In another embodiment, when the electronic device 130 is not coupled to the transmission interface 112 and the user clicks the option 312, the display panel 117 displays a black image until the electronic device 130 has been coupled to the transmission interface 112.

In other embodiments, the selection image 300 further comprises a brightness option 320. In FIG. 3B, when the user clicks the brightness option 320, the brightness of the display panel 117 can be adjusted. For example, when the user moves the brightness adjustment axis 321 to the right side, the brightness of the display panel 117 is increased. when the user moves the brightness adjustment axis 321 to the left side, the brightness of the display panel 117 is reduced.

The size of the selection image 300 is not limited in the present disclosure. In one embodiment, when the resolution of the display panel 117 is increased, the icons displayed on the display panel 117 are shrunk. At this time, the size of the selection image 300 is increased so that the user easily clicks the options. When the resolution of the display panel 117 is reduced, the icons displayed on the display panel 117 are enlarged. At this time, the selection image 300 has a small size to avoid the selection image 300 occupying the space of the image displayed on the display panel 117.

Figure 4:
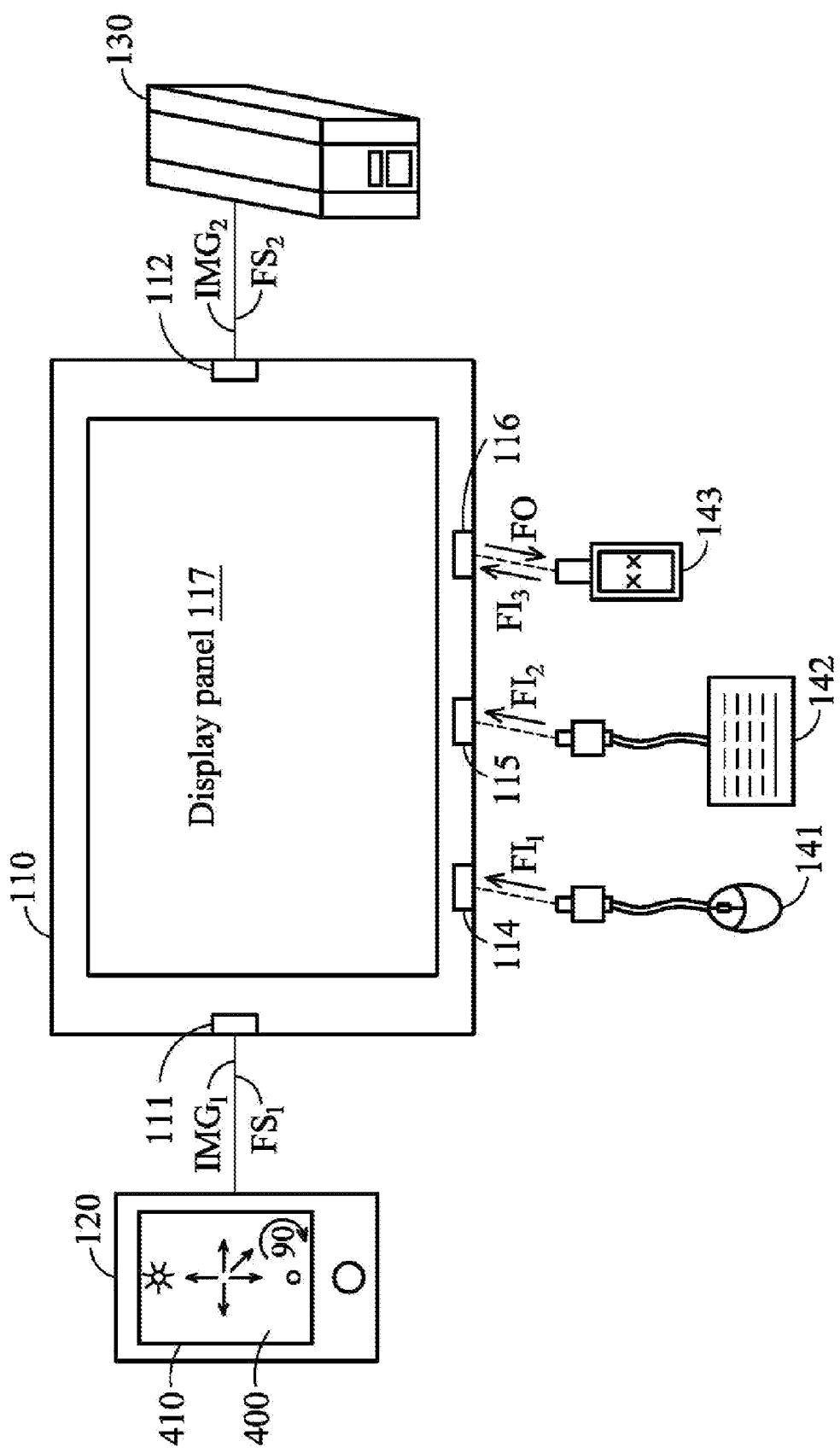
FIG. 4 is a schematic diagram of another exemplary embodiment of the display device, according to various aspects of the present disclosure.

FIG. 4 is a schematic diagram of another exemplary embodiment of the display device, according to various aspects of the present disclosure. In this embodiment, the electronic device 120 is a smartphone and has a touch panel 410. Additionally, the electronic device 130 is a host. In this case, the transmission interfaces 111 and 112 are USB Type-C ports, but the disclosure is not limited thereto.

When the user activates a switch application program in the electronic device 120, the touch panel 410 displays a selection image 400 used for the user to switch the source which provides the image signal. In this case, the image displayed on the display panel 117 may synchronize with the selection image 400 of the touch panel 410. In this embodiment, the electronic device 120 detects the pattern track which is drawn by the user and on the touch panel 410 to generate a detection result. The electronic device 120 provides selection information $FS_1$ to the display device 110 according to the detection result. The SOC in the display device 110 selects the image source providing the image signal according to the selection information $FS_1$.

For example, when the finger of the user contacts the touch panel 410 and moves to the right side of the touch panel 410, the electronic device 120 sends the selection information $FS_1$. At this time, since the selection information $FS_1$ matches a first predetermined condition, the display device 110 selects the image signal $IMG_2$ from the electronic device 130 and displays an image according to the image signal Additionally, the display device 110 turns on the data paths between the transmission interface 112 and each of the peripheral interfaces 114-116. Therefore, the user can operate the electronic device 130 via the mouse 141 and the keyboard 142. Furthermore, the electronic device 130 can access the USB disk 143.

In other embodiments, when the finger of the user contacts the touch panel 410 and moves to the upper side of the touch panel 410, the electronic device 120 sends the selection information $FS_1$ according to the user's gesture. In this case, since the selection information $FS_1$ may match a second predetermined condition, the display device 110 increases the brightness of the display panel 117. However, the finger of the user contacts the touch panel 410 and moves to a lower side of the touch panel 410, the display device 110 reduces the brightness of the display panel 117. In other embodiments, the user utilizes the selection image 400 to adjust the image displayed on the display panel 117. For example, when the finger of the user contacts the touch panel 410 and moves to the lower right side of the touch panel 410, the image displayed on the display panel 117 may be rotated 90 degrees to the right side of the display panel 117.

Figure 5A:
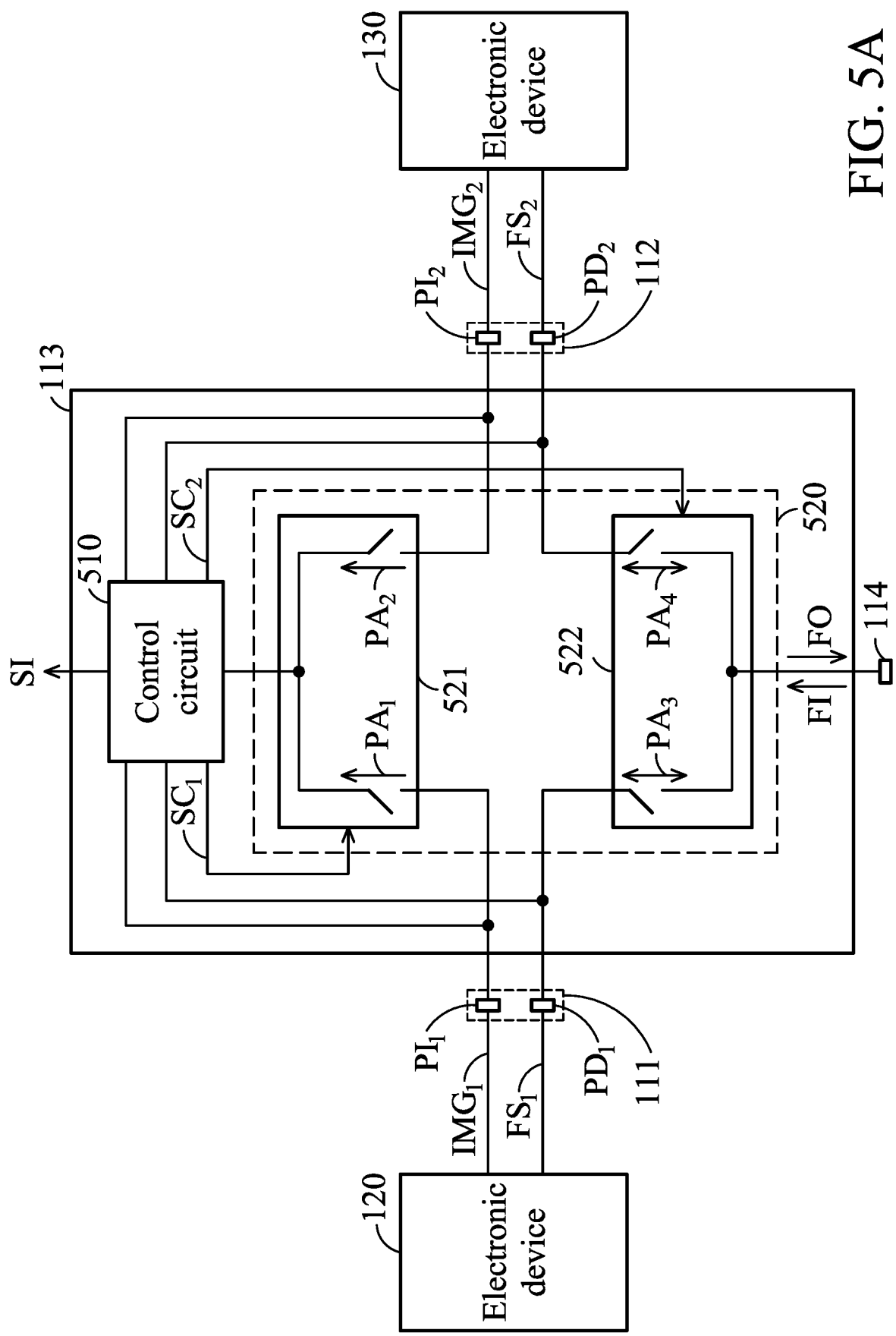
FIG. 5A is a schematic diagram of an exemplary embodiment of a system on chip, according to various aspects of the present disclosure.

FIG. 5A is a schematic diagram of an exemplary embodiment of the SOC 113, according to various aspects of the present disclosure. The SOC 113 comprises a control circuit 510 and a switch circuit 520. The control circuit 510 generates control signals $SC_1$ and $SC_2$ according to the voltage levels of the transmission interfaces 111 and 112 to control the switch circuit 520. In one embodiment, the control circuit 510 is a scalar.

In this embodiment, the control circuit 510 determines whether the electronic devices 120 and 130 provide the image signals $IMG_1$ and $IMG_2$ according the voltage levels of the image transmission ports $PI_1$ and $PI_2$ to generate a determination result. In this case, the control circuit 510 generates the control signals $SC_1$ and $SC_2$ according to the determination result. For example, when the image transmission port $PI_1$ does not receive the image signal $IMG_1$, the voltage level of a specific pin of the image transmission port $PI_1$ is equal to a predetermined value. When the image transmission port $PI_1$ receives the image signal $IMG_1$, the voltage level of the specific pin of the image transmission port $PI_1$ is not equal to the predetermined value. Therefore, the control circuit 510 obtains whether the electronic device 120 or 130 provides the image signal $IMG_1$ or $IMG_2$ according to the voltage levels of the specific pins of the image transmission ports $PI_1$ and $PI_2$.

In other embodiments, the control circuit 510 receives the selection information $FS_1$ and $FS_2$ via the data transmission ports $PD_1$ and $PD_2$ and adjusts the control signals $SC_1$ and $SC_2$ according to the selection information $FS_1$ and $FS_2$. In some embodiments, the control circuit 510 further adjusts the display signal SI according to the selection information $FS_1$ and $FS_2$.

The switch circuit 520 is coupled to the transmission interfaces 111 and 112 and turns on at least one of the image path $PA_1$ between the transmission interface 111 and the control circuit 510 and the image path $PA_2$ between the transmission interface 112 and the control circuit 510 according to the control signal $SC_1$. Furthermore, the switch circuit 520 turns on the data path $PA_3$ between the transmission interface 111 and the peripheral interface 114 or turns on the data path $PA_4$ between the transmission interface 112 and the peripheral interface 114 according to the control signal $SC_2$.

The structure of switch circuit 520 is not limited in the present disclosure. In this embodiment, the switch circuit 520 comprises a switch module 521. The switch module 521 controls the image paths $PA_1$ and $PA_2$ according to the control signal $SC_1$. The image path $PA_1$ is coupled between the transmission interface 111 and the control circuit 510. The image path $PA_2$ is coupled between the transmission interface 112 and the control circuit 510.

When the control signal $SC_1$ matches a first state (e.g., the level of the control signal $SC_1$ is at a first voltage), the switch module 521 turns on the image path $PA_1$ and turns off the image path $PA_2$. Therefore, the image path $PA_1$ transmits the image signal $IMG_1$ to the control circuit 510. When the control signal $SC_1$ matches a second state (e.g., the level of the control signal $SC_1$ is at a second voltage), the switch module 521 turns on the image path $PA_2$ and turns off the image path $PA_1$. Therefore, the image path $PA_2$ transmits the image signal $IMG_2$ to the control circuit 510. In other embodiments, when the control signal $SC_1$ matches a third state (e.g., the level of the control signal $SC_1$ is at a third voltage), the switch module 521 turns on the image paths $PA_1$ and $PA_2$ to transmit the image signals $IMG_1$ and $IMG_2$ to the control circuit 510.

In other embodiments, the switch circuit 520 further comprises a switch module 522. The switch module 522 controls the data paths $PA_3$ and $PA_4$ according to the control signal $SC_2$. The data path $PA_3$ is coupled between the transmission interface 111 and the peripheral interface 114. The data path $PA_4$ is coupled between the transmission interface 112 and the peripheral interface 114.

When the control signal $SC_2$ matches a first state (e.g., the level of the control signal $SC_2$ is at a first voltage), the switch module 522 turns on the data path $PA_3$. Therefore, the electronic device 120 can receive the input information FI from the peripheral interface 114 or provide the output information FO to the peripheral interface 114. When the control signal $SC_2$ matches a second state (e.g., the level of the control signal $SC_2$ is at a second voltage), the switch module 522 turns on the data path $PA_4$. Therefore, the electronic device 130 can receives the input information FI form the peripheral interface 114 or provide the output information FO to the peripheral interface 114.

For brevity, FIG. 5A only shows the electronic devices 120 and 130. Therefore, the switch module 522 provides two data paths (e., $PA_3$ and $PA_4$). In other embodiments, when the SOC 113 is coupled to more electronic devices, the switch module 522 provides more data paths. Additionally, the switch circuit 520 may comprise more switch modules 522. In this case, each switch module 522 is coupled between a peripheral interface 114 and many electronic devices.

Figure 5B:
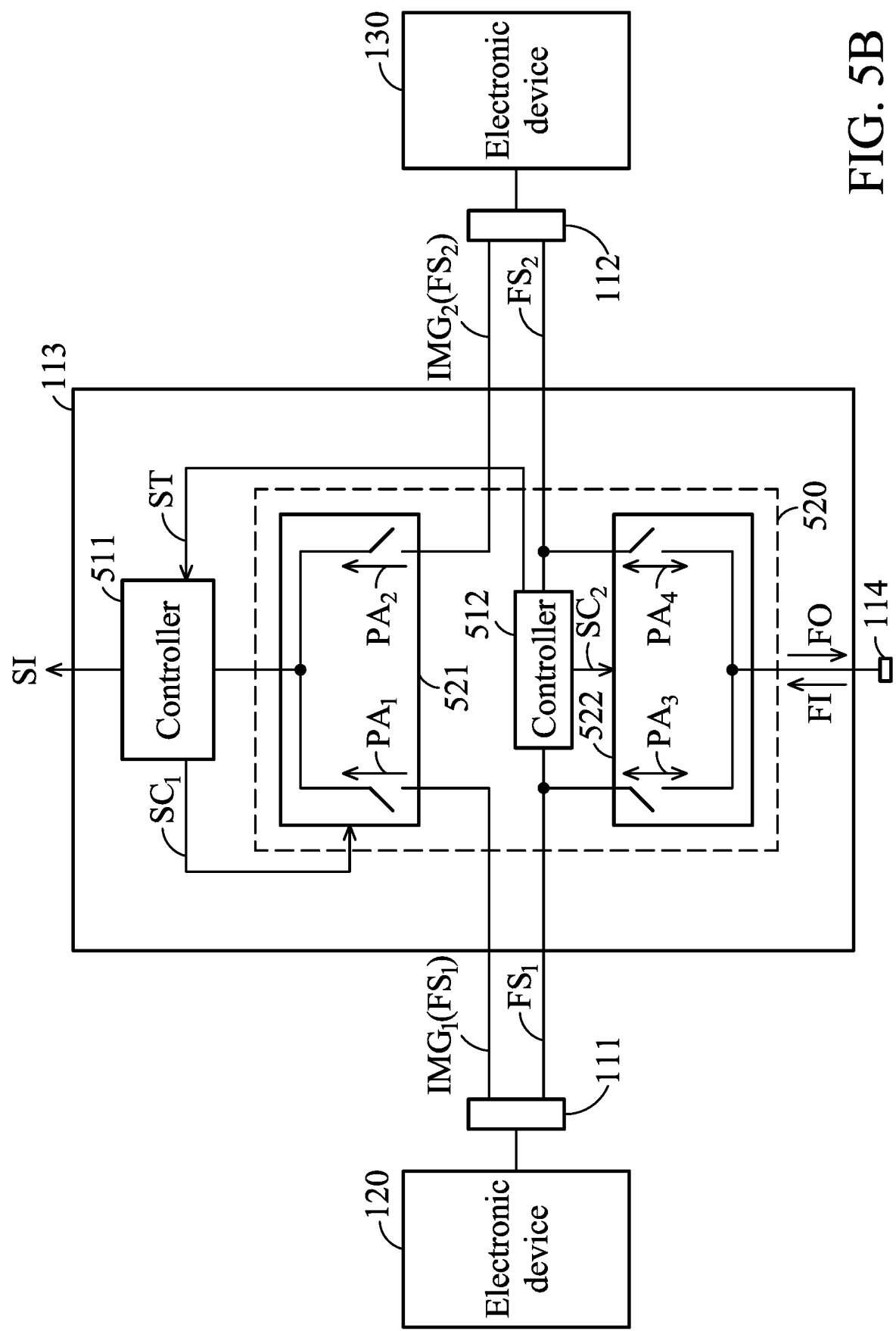
FIG. 5B is a schematic diagram of another exemplary embodiment of the system on chip, according to various aspects of the present disclosure.

FIG. 5B is a schematic diagram of another exemplary embodiment of the SOC 113, according to various aspects of the present disclosure. In this embodiment, the SOC 113 comprises controllers 511, 512 and the switch modules 521 and 522. The controller 511 generates the control signal $SC_1$ according to a trigger signal ST to direct the switch module 521 to output at least one of the image signals $IMG_1$ and $IMG_2$. In some embodiments, the controller 511 decodes the image signal $IMG_1$ or $IMG_2$ to obtain the selection information $FS_1$ or $FS_2$ and adjusts the display signal SI according to the selection information $FS_1$ or $FS_2$.

The controller 512 detects the voltage levels of the image pins of the transmission interfaces 111 and 112 to determine whether the electronic devices 120 and 130 provide the image signals $IMG_1$ and $IMG_2$ and generates the trigger signal ST and the control signal $SC_2$ according to the determination result. For example, when the electronic device 120 is coupled to the transmission interface 111, the controller 512 generates the trigger signal ST to notify the controller 511. In this case, the controller 511 generates the control signal $SC_1$ to direct the switch module 521 to turn on the image path $PA_1$. At this time, the switch module 521 turns off the image path $PA_2$. Additionally, the controller 512 utilizes the control signal $SC_2$ to direct the switch module 522 to turn on the data path $PA_3$ and turn off the data path $PA_4$. Therefore, the electronic device 120 receives the input information FI from the peripheral interface 114 or provides the output information FO to the peripheral interface 114 via the data path $PA_3$.

In other embodiments, when the electronic device 130 is coupled to the transmission interface 111, the controller 512 utilizes the trigger signal ST to notify the controller 511. Therefore, the controller 511 directs the switch module 521 to turn on the image path $PA_2$. At this time, the switch module 521 turns off the image path $PA_1$. Furthermore, the controller 512 utilizes the control signal $SC_2$ to direct the switch module 522 to turn on the data path $PA_4$ and turn off the data path $PA_3$. Therefore, the electronic device 130 receives the input information FI from the peripheral interface 114 or provides the output information FO to the peripheral interface 114 via the data path $PA_4$.

In one embodiment, the controller 511 and the switch module 521 are integrated into a first integrated circuit (IC). In this case, the controller 512 and the switch module 522 are integrated into a second IC. The first IC and second IC operate independently. In another embodiment, the controller 512 receives the selection information $FS_1$ or $FS_2$ and provides the selection information $FS_1$ or $FS_2$ to the controller 511 via another transmission line (not shown).

Figure 5C:
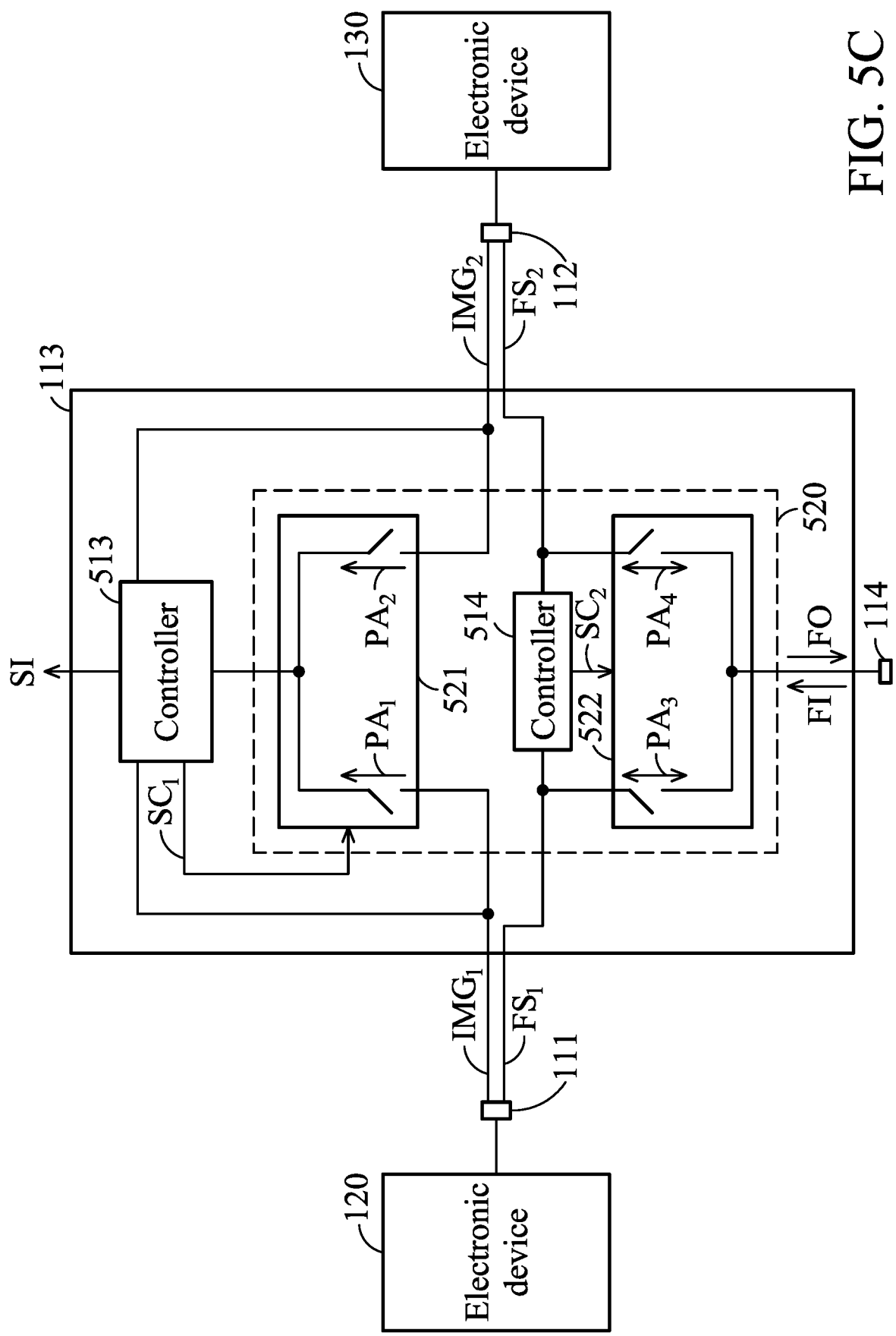
FIG. 5C is a schematic diagram of another exemplary embodiment of the system on chip, according to various aspects of the present disclosure.

FIG. 5C is a schematic diagram of another exemplary embodiment of the SOC 113, according to various aspects of the present disclosure. FIG. 5C is similar to FIG. 5B except that the controller 513 detects the voltage levels of the image pins of the transmission interfaces 111 and 112 to determine whether the transmission interfaces 111 and 112 receive the image signals. Using the transmission interface 111 as an example, when the voltage level of the image pin of the transmission interface 111 is not equal to an initial value, it means that the transmission interface 111 has received the image signal $IMG_1$. Therefore, the controller 513 uses the control signal $SC_1$ to direct the switch module 521 to turn on the image path $PA_1$. At this time, the switch module 521 may turn off the image path $PA_2$. In other embodiments, if the transmission interface 111 receives the image signal $IMG_1$ and the transmission interface 112 receives the image signal $IMG_2$, the controller 513 may use the control signal $SC_1$ to direct the switch module 521 to turn on the image paths $PA_1$ and $PA_2$.

In other embodiments, the controller 530 determines that the transmission interface 111 has received the image signal $IMG_1$, the controller 530 triggers the controller 514 so that the controller 514 uses the control signal $SC_2$ to direct the switch module 52s to turn on the data path $PA_3$. Similarly, when the controller 513 determines that the transmission interface 112 has received the image signal $IMG_2$, the controller 513 triggers the controller 514 so that the controller 514 uses the control signal $SC_2$ to direct the switch module 522 to turn on the data path $PA_4$. In some embodiments, when the controller 513 determines that the transmission interface 111 has received the image signal $IMG_1$ and the transmission interface 112 has received the image signal $IMG_2$, the controller 513 directs the controller 514 to turn on the data path $PA_3$ or $PA_4$ according to a predetermined value. In this embodiment, the controller 514 provides the selection information $FS_1$ and $FS_2$ from the electronic devices 120 and 130 to the controller 513. The controller 513 adjusts the display signal SI according to the selection information $FS_1$ or $FS_2$.

Figure 5D:
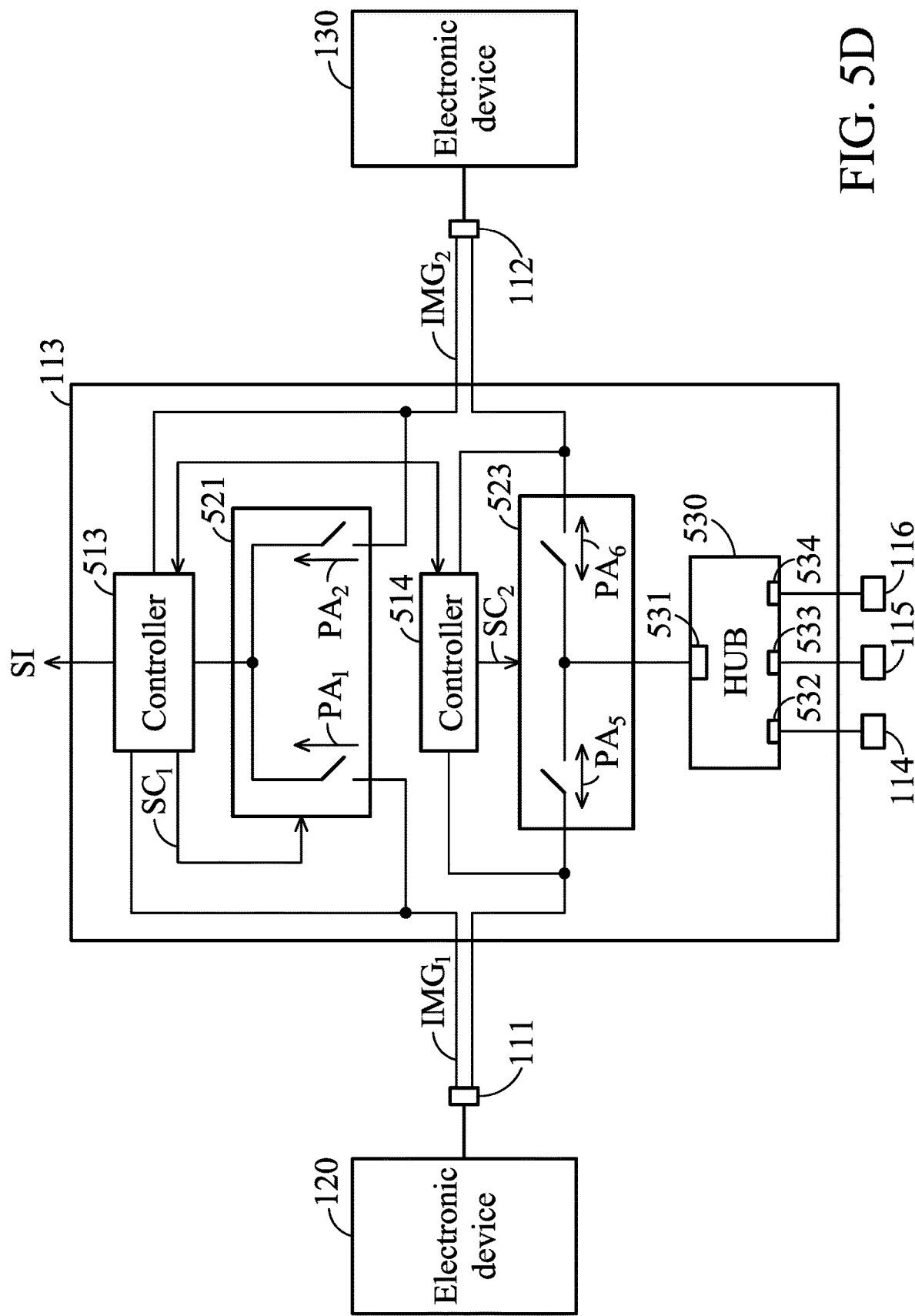
FIG. 5D is a schematic diagram of another exemplary embodiment of the system on chip, according to various aspects of the present disclosure.

FIG. 5D is a schematic diagram of another exemplary embodiment of the SOC 113, according to various aspects of the present disclosure. FIG. 5D is similar to FIG. 5C except that the switch module 523 is coupled between the controller 514 and a hub 530. The hub 530 has an upstream port (UFP) 531 and downstream ports (DFPs) 532~534. The UFP 531 is coupled to the switch module 523. The DFP 532 is coupled to the peripheral interface 114. The DFP 533 is coupled to the peripheral interface 115. The DFP 534 is coupled to the peripheral interface 116. The switch module 523 provides data paths $PA_5$ and $PA_6$. The data path $PA_5$ is coupled between the transmission interface 111 and the UFP 531. The data path $PA_6$ is coupled between the transmission interface 112 and the UFP 531.

When the electronic device 120 is coupled to the transmission interface 111, the controller 513 triggers the controller 514. The controller 514 utilizes the control signal $SC_2$ to direct the switch module 523 to turn on the data path $PA_5$. At this time, the switch module 522 turns off the data path $PA_6$.

When the electronic device 130 is coupled to the transmission interface 112, the controller 514 sends the control signal $SC_2$. The switch module 523 turns on the data path $PA_6$ and turns off the data path $PA_5$ according to the control signal $SC_2$.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A display device capable of switching image sources, comprising:
   a first transmission interface configured to be coupled to a first electronic device and receive a first image signal from the first electronic device;
   a second transmission interface configured to be coupled to a second electronic device and receive a second image signal from the second electronic device;
   a first peripheral interface configured to be coupled to a first peripheral device providing input information;
   a system on chip (SOC) selecting at least one of the first and second image signals according to the input information to generate a display signal; and
   a display panel displaying an image according to the display signal,
   wherein:
   the second transmission interfaces is a USB Type-C connector, and
   the USB Type-C connector transmits first output information from the second electronic device to the first peripheral device and transmits the input information from the first peripheral device to the second electronic device.

2. The display device capable of switching image sources as claimed in claim 1, wherein in response to the SOC selecting the first image signal to generate the display signal:
   the first electronic device receives the input information via the first transmission interface and generates selection information according to the input information, and
   the SOC receives the selection information via the first transmission interface and directs the display panel to display a selection image according to the selection information.

3. The display device capable of switching image sources as claimed in claim 2, wherein in response to a specific option of the selection image being clicked, the SOC performs a specific operation.

4. The display device capable of switching image sources as claimed in claim 3, wherein the specific operation is to generate the display signal according to the second image signal and to turn on a data path between the first peripheral interface and the second transmission interface.

5. The display device capable of switching image sources as claimed in claim 3, wherein the specific operation is to adjust the brightness of the display panel or to adjust the resolution of the display panel.

6. The display device capable of switching image sources as claimed in claim 2, wherein:
   the display panel has a specific area to display the selection image, and the selection image has a first option and a second option, in response to the first option being clicked, the SOC generates the display signal according to the first image signal, in response to the second option being clicked, the SOC generates the display signal according to the second image signal, and in response to a cursor being moved to the specific area and the duration which the cursor is at the specific area in being equal to a predetermined time, the selection image is displayed in the specific area.

7. The display device capable of switching image sources as claimed in claim 6, wherein the selection image further has a third option, and in response to the third option being clicked, the SOC adjusts the brightness of the display panel.

8. The display device capable of switching image sources as claimed in claim 1, wherein the SOC comprises:

a control circuit generating a control signal according to voltage levels of the first and second transmission interfaces; and a switch circuit coupled to the first and second transmission interfaces to receive the first and second image signals and outputting at least one of the first and second image signals to the control circuit according to the control signal so that the control circuit generates the display signal according to at least one of the first and second image signals.

9. The display device capable of switching image sources as claimed in claim 8, wherein:

in response to the switch circuit providing the first image signal to the control circuit, the switch circuit provides the input information to the first electronic device via the first transmission interface, and in response to the switch circuit providing the second image signal to the control circuit, the switch circuit provides the input information to the second electronic device via the second transmission interface.

10. The display device capable of switching image sources as claimed in claim 9, further comprising:

a second peripheral interface configured to be coupled to a second peripheral device, wherein in response to the switch circuit providing the first image signal to the control circuit and the first electronic device providing second output information to the first transmission interface, the switch circuit provides the second output information to the second peripheral device.

11. The display device capable of switching image sources as claimed in claim 10, further comprising:

a hub comprising an upstream port, a first downstream port and a second downstream port, wherein the upstream port is coupled to the switch circuit, the first downstream port is coupled to the first peripheral interface, and the second downstream port is coupled to the second peripheral interface.

12. The display device capable of switching image sources as claimed in claim 1, wherein the first transmission interfaces is a USB Type-C connector.

13. The display device capable of switching image sources as claimed in claim 1, wherein the first transmission interface comprises a first image transmission port to receive the first image signal, the second transmission interface comprises a second image transmission port to receive the second image signal, and the type of the first image transmission port is different from the type of the second image transmission port or the same as the type of the second image transmission port.

14. The display device capable of switching image sources as claimed in claim 1, wherein:

in response to the first transmission interface being coupled to the first electronic device and the second transmission interface not being coupled to the second electronic device, the SOC provides the first image signal as the display signal, and in response to the first transmission interface not being coupled to the first electronic device and the second transmission interface being coupled to the second electronic device, the SOC provides the second image signal as the display signal.

15. The display device capable of switching image sources as claimed in claim 1, wherein in response to the first transmission interface being coupled to the first electronic device, the second transmission interface being coupled to the second electronic device, and the first peripheral interface not receiving the input information from the first peripheral device, the SOC provides the first or second image signal as the display signal according to a predetermined value.

16. The display device capable of switching image sources as claimed in claim 1, wherein in response to the first transmission interface being coupled to the first electronic device, the second transmission interface being coupled to the second electronic device, and the first peripheral interface not receiving the input information from the first peripheral device, the SOC combines the first and second image signals to generate a third image signal and the display panel displays a Picture-in-Picture (PIP) according to the third image signal.

17. An operating system comprising:

a first electronic device providing a first image signal;

a second electronic device providing a second image signal; and a display device comprising:

a first transmission interface configured to be coupled to the first electronic device and receive the first image signal;

a second transmission interface configured to be coupled to the second electronic device and receive the second image signal;

a first peripheral interface configured to be coupled to a first peripheral device providing input information;

a system on chip (SOC) selecting at least one of the first and second image signals according to the input information to generate a display signal; and a display panel displaying an image according to the display signal, wherein:

the second transmission interfaces is a USB Type-C connector, and the USB Type-C connector transmits first output information from the second electronic device to the first peripheral device and transmits the input information from the first peripheral device to the second electronic device.

18. The operating system as claimed in claim 17, wherein in response to the SOC selecting the first image signal to generate the display signal:

the first electronic device receives the input information via the first transmission interface and generates selection information according to the input information, and the SOC receives the selection information via the first transmission interface and directs the display panel to display a selection image according to the selection information.

19. The operating system as claimed in claim 18, wherein:

in response to a first option of the selection image being clicked, the SOC generates the display signal according to the first image signal, and in response to a second option of the selection image being clicked, the SOC generates the display signal according to the second image signal.

20. The operating system as claimed in claim 19, wherein in response to a third option of the selection image being clicked, the SOC adjusts the brightness of the display panel.

* * * * *